United States Patent
Hong

[11] Patent Number: 5,824,975
[45] Date of Patent: Oct. 20, 1998

[54] SPEED CONTROL APPARATUS FOR COMPENSATING VIBRATION OF ELEVATOR

[75] Inventor: Chan-Ook Hong, Seoul, Rep. of Korea

[73] Assignee: LG Industrial Systems Co., Ltd., Seoul, Rep. of Korea

[21] Appl. No.: 749,642

[22] Filed: Nov. 15, 1996

[30] Foreign Application Priority Data

Nov. 23, 1995 [KR] Rep. of Korea ................. 43157/1995

[51] Int. Cl.⁶ ................. B66B 1/34; H02P 1/00; H02P 5/34
[52] U.S. Cl. .......... 187/292; 318/802; 318/271; 187/393
[58] Field of Search ................. 187/289, 292, 187/294, 297, 393, 391; 318/271, 609, 432, 802, 806

[56] References Cited

U.S. PATENT DOCUMENTS

| | | | |
|---|---|---|---|
| 4,684,856 | 8/1987 | Kohkipuro | 318/310 |
| 5,184,055 | 2/1993 | Ohishi et al. | 318/615 |
| 5,476,158 | 12/1995 | Mann et al. | 187/289 |
| 5,542,501 | 8/1996 | Ikejima et al. | 187/292 |
| 5,635,689 | 6/1997 | Shepard et al. | 187/292 |

*Primary Examiner*—Robert Nappi
*Attorney, Agent, or Firm*—Oliff & Berridge, PLC

[57] ABSTRACT

A speed control apparatus for operating a cage of an elevator at a speed suitable for a required operation condition is capable of reducing a mechanical vibration generated from the cage by obtaining a torque of the winding machine from a speed-controlled current command and an acceleration of the winding machine from the torque and the present acceleration of the winding machine to compensate for and output the value of the current command when a high speed elevator having a low mechanical resonant frequency is operated.

3 Claims, 3 Drawing Sheets

SPEED CONTROL APPARATUS FOR COMPENSATING VIBRATION OF ELEVATOR

BACKGROUND OF THE INVENTION

1. Field of the Invention

The present invention relates to a speed control apparatus for operating a cage of an elevator at a speed suitable for a required operation condition, and more particularly, to an improved speed control apparatus for compensating a vibration of an elevator and which is capable of reducing a mechanical vibration when a high speed elevator having a low mechanical resonant frequency is operated.

2. Description of the Prior Art

A speed control apparatus of an elevator is an apparatus which operates a cage at a speed suitable for an operating condition.

FIG. 1 is a view showing the construction of a speed control apparatus of an elevator according to the conventional art. As shown in this drawing, the speed control apparatus of the elevator includes a winding machine 118 having a motor and a sheave, a cage 121 and a counterweight 122 for carrying out a vertical movement in accordance with a rotation of the winding machine 118 through cables 119,120, a pulse generator 117 for outputting a pulse signal (p1) in accordance with a rotation of the winding machine 118, a pulse amplifier 115 for receiving the pulse signal outputted from the pulse generator 117 and outputting a pulse signal (p2) which corresponds to a rotation speed of the winding machine 118, a subtractor 112 for subtracting the pulse signal (p2) outputted from the pulse amplifier 115 from a speed command signal (u*) externally inputted and outputting a speed error signal (e), a speed controller 113 for receiving the speed error signal from the subtractor 112 and performing proportional and integrational controls to output a current command signal (i*), a current controller 114 for converting the current command signal (i*) into a voltage command signal (v*) and outputting it, and an inverter 116 for operating the winding machine 118 in accordance with the voltage command signal (v*).

k1 represents a spring constant of the cable 119 connecting the sheave of the winding machine 118 and the cage 121, C1 a damping coefficient of the cable 119, k2 a spring constant of the cable 120 connecting the sheave of the winding machine 118 and the counterweight 122, and C2 a damping coefficient of the cable 120.

The operation of the speed control apparatus of the elevator according to the conventional art will now be described with reference to FIG. 2.

When an operating command for an elevator is externally inputted, the speed command (u*) is inputted to the speed controller 113 through the subtractor 112 from an external operation managing apparatus (not illustrated).

When the winding machine 118 is operated, the cage 121 connected to the sheave through the cable 119 carries out a vertical movement, and in accordance with the rotation of the winding machine 118, the pulse generator 117 generates the pulse signal (p1), and the pulse amplifier 115 receives the pulse signal (p1) to output the pulse signal (p2) corresponding to the rotating speed of the winding machine 118 to the subtractor 112.

The error signal (e) between the pulse (p1) and the speed command signal (u*) is obtained in the subtractor 112, and the error signal (e) shows that an actual operating speed of the winding machine 118 is different from a desired speed.

In accordance with the speed command signal (u*), the speed controller 113 is proportional-controlled with a proportional gain (Kp–s), and integral-controlled with an integral gain (Ki–s) to output the current command signal (i*) for moving the cage 121 in accordance with the speed command signal (u*). The current command signal (i*) is current-controlled in accordance with a gain (K) in the current controller 114 to be converted into the voltage command signal (v*) and applied to the inverter 116, and as a result, the inverter 116 operates the winding machine 118.

The elevator system is a mechanical system including the masses of the winding machine 118, the cage 121 and the counterweight 122, the springs represented by k1 and k2, and the damping coefficients represented by C1 and C2, and the system that has an inherent resonant frequency.

FIG. 2 is a view showing an output amplitude of the system which is a speed of the cage 121 with respect to a variation of an input frequency of the speed command signal (u*) when the speed command signal (u*) is the input and the speed of the cage 121 is the output.

The frequency (wsc1) is a cut-off frequency of the speed controller 113, which is a factor for determining the response characteristic of the system with respect to the speed command signal (u*). The higher the frequency (wsc1), the faster the response characteristic. Here, frequencies (w1,w2) are mechanical resonant frequencies of the system.

When the output is greater than 0dB like in a waveform 21 indicated by a solid line, a response having a large resonant frequency quality is shown, resulting in generating a vibration having a resonant frequency quality and consequently increasing a vibration of the cage due to a ripple in an output torque from the motor of the winding machine and lowering the ride of the elevator.

If the proportional gain (Kp–s) and the integral gain (Ki–s) of the speed controller 113 are adjusted, like in a waveform 22 indicated by a dotted line in FIG. 2, the cut-off frequency (wsc1) is lowered, and accordingly the response of the system is slowed down, the entire output amplitude is lowered, and as a result, the resonant frequencies (w1,w2) are lowered below the 0dB level. Therefore, the vibration is controlled and the above-described problems can be solved.

However, in a high speed elevator system which has a high frequency, the size of a mechanical resonant frequency (w1,w2) is small, and is near that of the cut-off frequency (wsc1) of the speed controller. Therefore, when the resonant frequencies (w1,w2) are lowered by adjusting the proportional gain (Kp–s) and the integral gain (Ki–s), the cut-off frequency (wsc1) is also lowered, resulting in debasing the response characteristic of the system with respect to the speed command (u*).

Therefore, a disadvantageous limit exists in controlling the vibration of the cage in the above-described method.

SUMMARY OF THE INVENTION

Accordingly, an object of the present invention is to compensate for a vibration of a cage by outputting an acceleration value of a cage while maintaining a speed estimating characteristic of an elevator in the same way as in the conventional art, in controlling a speed of an elevator.

To achieve the above object, in a speed control apparatus of an elevator a cage of which is operated in accordance with a desired speed command by carrying out a speed control with a proportion, a proportional differentiation or a proportional integration, the improvement includes a vibration compensator which, after obtaining an acceleration of a winding machine and a compensation current from the acceleration, adds the compensation current to an original current command or subtracts the compensation current from the original current command.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the accompanying drawings, the speed control apparatus for compensating a vibration of an elevator according to the present invention will now be described in detail.

Figure 3:
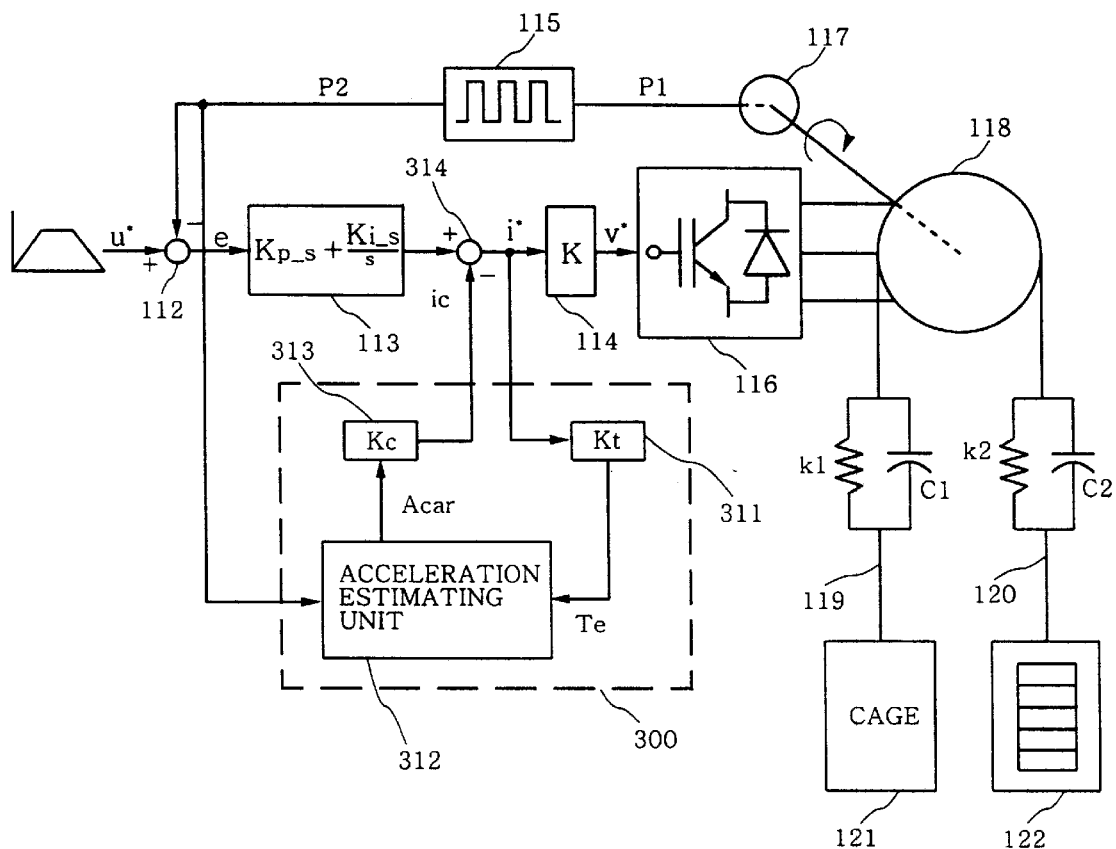
FIG. 3 is a schematic diagram showing the construction of a speed control apparatus for compensating a vibration of an elevator according to the present invention.

FIG. 3 is a schematic diagram showing the construction of a speed control apparatus for compensating a vibration of an elevator according to the present invention. As shown in this drawing, the elevator includes a winding machine 118 having a motor and a sheave, a cage 121 and a counterweight 122 for performing a vertical movement according to a rotation of the winding machine 118 through cables 119,120. The speed control apparatus includes a pulse generator 117 for outputting a pulse signal (p1) in accordance with a rotation of the winding machine 118, a pulse amplifier 115 for receiving the pulse signal (p1) to output a pulse signal (p2) corresponding to a rotating speed of the winding machine 118, a first subtractor 112 for subtracting the pulse signal (p2) from the pulse amplifier 115 from a speed command signal (u*) externally inputted to calculate a speed error signal (e), a speed controller 113 for receiving the speed error signal (e) and carrying out proportional and integral controls to output a current command signal (i*), a vibration compensator 300 for receiving the output pulse (p2) from the pulse amplifier 115, calculating an output torque (Te) from the winding machine 118 to calculate an acceleration of the cage 121 and to generate a new current command signal (i*) from a compensation current obtained from the acceleration and the original current command signal (i*), a current controller 114 for converting the new current command signal (i*) into a voltage command signal (v*) and outputting it, and an inverter 116 for operating the winding machine 118 in accordance with the voltage command signal (v*).

The vibration compensator 300 includes a torque calculator 311 for multiplying the current command signal (i*) by a gain (Kt) to calculate a torque value (Te) of the winding machine 118, an acceleration estimating unit 312 for receiving the torque value (Te) and the output pulse signal (p2) from the pulse amplifier 115 to calculate an acceleration value (Acar) of the cage 121, a compensation current generator 313 for multiplying the acceleration value (Acar) by a compensating gain value (Kc) to generate a compensation current ($i_c$), and a second subtractor 314 for subtracting the compensation current signal ($i_c$) from the current command signal (i*) to obtain the new current command signal (i*) and output it to the current controller 114.

The operation of the present invention will now be described in detail with reference to FIGS. 4 through 6.

When an operating command of an elevator is inputted, a speed command signal (u*) is inputted to the subtractor 112 from an external operating management apparatus (not illustrated), and the pulse signal (p2) outputted from the pulse amplifier 115 is also inputted to the subtractor 112.

Accordingly, an error signal (e) representing the difference between the pulse signal (p2) and the speed command signal (u*) is obtained in the subtractor 112, and the speed controller 113 then performs a proportional control with a proportional gain (Kp-s) and an integral control with an integral gain (Ki-s) in accordance with the error signal (e) to output the current command signal (i*) to the current controller 114.

Here, the torque calculator 311 in the vibration compensator 300 multiplies the current command signal (i*) by a torque constant (Kt) to calculate a torque value (Te), wherein the torque value (Te) represents an output torque from the motor. The acceleration estimating unit 312 receives the torque value (Te) and the pulse signal (p2) from the pulse amplifier 115 to estimate an acceleration value (Acar), wherein the pulse signal (p2) represents the speed of the sheave of the winding machine 118.

Figure 4:
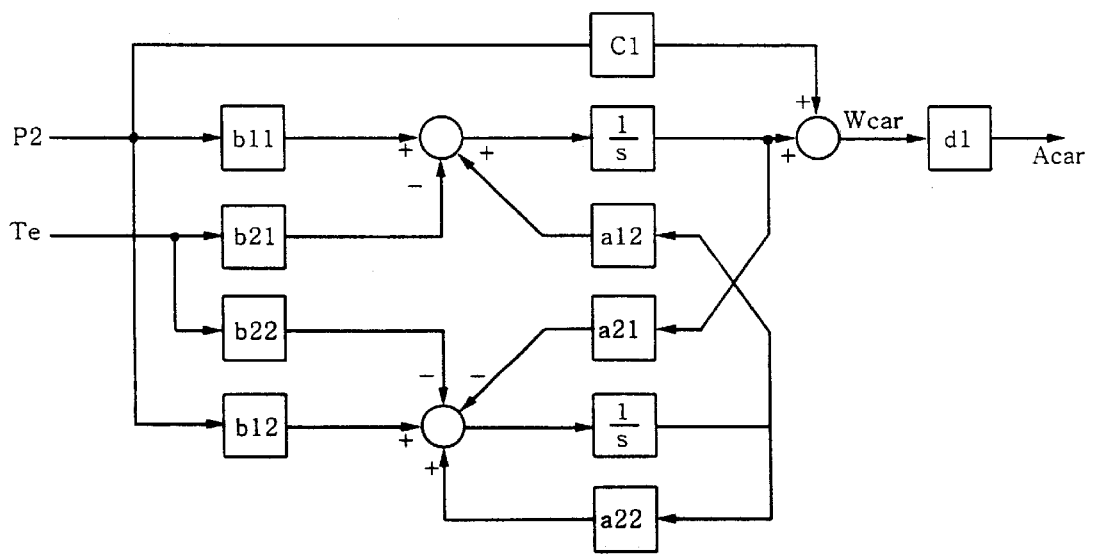
FIG. 4 is a schematic diagram showing the construction of a vibration compensator in FIG. 3.

FIG. 4 is a view showing an inner construction of the vibration compensator 300 in FIG. 3, and Wcar represents a speed value of the cage.

That is, the acceleration estimating unit 312 receives the speed of the winding machine 118 and the output torque value (Te) from the motor to calculate the speed value (Wcar) in accordance with the following equation using each parameter of the system in each block b11, b12, b21, b22, a12, a22, c1, wherein J represents an inertia moment of the sheave of the winding machine 118, (r) a radius of the sheave, (m) a mass of the cage 121, (k) a spring constant between the sheave and the cage 121, and (L1 and L2) gains.

$$b_{11} = \frac{k}{m} L_1 + \frac{k}{m} L_1 L_2$$

$$b_{12} = r - L_1 + \frac{rk}{J} L_2^2$$

$$b_{21} = \frac{L_1}{J}$$

$$b_{22} = \frac{L_2}{J}$$

$$a_{12} = \frac{k}{m} + \frac{rk}{J} L_1$$

$$a_{21} = \frac{rk}{J} L_1$$

$$a_{22} = \frac{rk}{J} L_2$$

$$c_1 = L_1$$

The calculated speed value (Wcar) is converted into an acceleration value (Acar) in the block (d1).

"Here the symbol "s" means a laplace operator"

$$d_1 = s$$

The compensation current generator 313 multiplies the acceleration value (Acar) by the compensating gain (Kc) to calculate the compensation current value ($i_c$), and the calculated compensation current value ($i_c$) is subtracted from the current command signal (i*) outputted from the speed controller 113 in the second subtractor 314. Thereby, a new current command signal (i*) is inputted to the current controller 114. The current controller 114 applies the current-controlled voltage command signal (v*) to the inverter 116 to compensate the vibration of the cage 121 and move it to a desired position.

Figure 1:
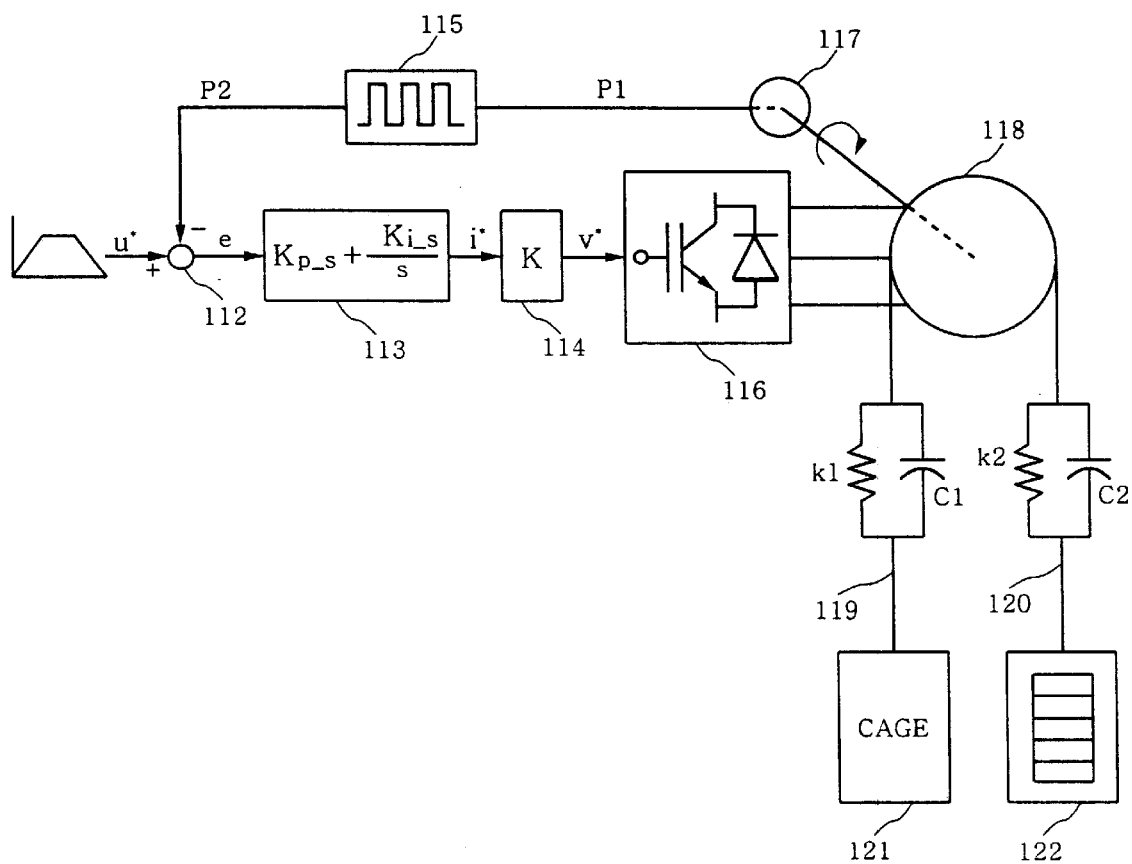
FIG. 1 is a schematic diagram view showing the construction of a speed control apparatus of an elevator according to the conventional art.
Figure 2:
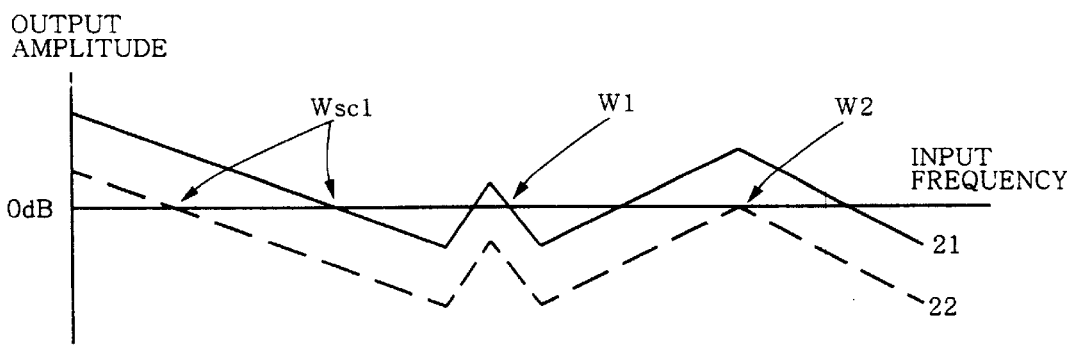
FIG. 2 is a graph showing the response amplitude of the system in FIG. 1 with respect to a variation of an input frequency.
Figure 5:
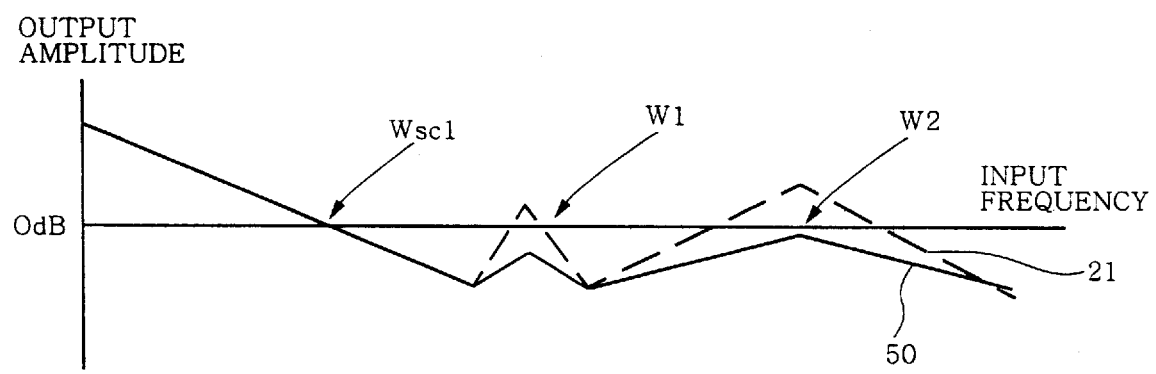
FIG. 5 is a graph showing the response of the system in FIG. 3 with respect to a variation of an input frequency.

FIG. 5 is a graph showing the system response with respect to a variation of an input frequency in FIG. 3. The waveform 50 indicated by a solid line shown in this drawing is a frequency response waveform according to the present invention, and the waveform 21 is identical to the frequency response waveform according to the conventional art shown in FIG. 2.

As shown in this drawing, in comparison with the conventional art, the cut-off frequency (wsc1) of the speed controller 113 is not changed and the resonant frequencies (w1,w2) are below 0dB, which indicates that the vibration of the cage is eliminated.

Accordingly, by obtaining a compensation with respect to the vibration of the cage in the vibration compensator in the form of a compensation current value and adding the compensation current value to the original current command signal or subtracting the former from the latter, the cut-off frequency is maintained and the frequency response is lowered below 0dB at the resonant frequency of the system.

Therefore, when the elevator is operated, the vibration of the cage is eliminated, and the ride of passengers in the cage is enhanced.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a speed control apparatus of an elevator system which is operated by performing speed and current controls to operate a winding machine at a desired speed, comprising:

a torque calculator for multiplying a current command value by a predetermined torque constant to obtain a torque value;

an acceleration estimating unit for receiving the torque value obtained in the torque calculator and a rotating speed of the winding machine to obtain an acceleration value of the cage;

a compensation current generator for multiplying the acceleration value of the cage by a compensating gain to generate a compensation current value; and a subtractor for subtracting the compensation current value from the current command value to obtain a new current command signal.

2. The apparatus of claim 1, further comprising:

a pulse generator for outputting a first pulse signal in accordance with a rotation of the winding machine; and a pulse amplifier for receiving the first pulse signal to output a second pulse signal corresponding to the rotating speed of the winding machine to the acceleration estimating unit.

3. In a speed control apparatus of an elevator system having a winding machine, a cage and counterweight, wherein the cage and the counterweighter are vertically moved and respectively connected by connecting cables to the winding machine having a motor and a sheave, comprising:

a pulse generator for outputting a first pulse signal in accordance with a rotation of the winding machine;

a pulse amplifier for receiving the first pulse signal to output a second pulse signal corresponding to a rotating speed of the winding machine;

a first subtractor for subtracting the second pulse signal from an externally inputted speed command signal to calculate a speed error;

a speed controller for receiving the speed error and for outputting a current command signal;

a torque calculator for multiplying the current command signal by a predetermined torque constant to obtain a torque value;

an acceleration estimating unit for receiving the torque value and the second pulse signal to obtain an acceleration value of the cage;

a compensation current generator for multiplying the acceleration value of the cage by a compensating gain to generate a compensation current value;

a second subtractor for subtracting the compensation current value from the current command signal to obtain a new current command signal;

a current controller for converting the new current command signal into a voltage command signal; and an inverter for operating the winding machine in accordance with the voltage command signal.

* * * * *